United States Patent [19]
Babb

[11] Patent Number: 5,207,241
[45] Date of Patent: May 4, 1993

[54] LIQUID SHUT-OFF VALVE

[76] Inventor: Matthew T. Babb, 1666 S. Santa Fe Ave., Vista, Calif. 92084

[21] Appl. No.: 925,875

[22] Filed: Aug. 7, 1992

[51] Int. Cl.$^5$ .................. F16K 31/32; F16K 33/00
[52] U.S. Cl. .................. 137/447; 137/312; 137/315; 137/450; 141/198; 251/283; 251/309
[58] Field of Search ............... 137/312, 315, 445, 447, 137/450; 251/283, 304, 309, 315; 141/198

[56] References Cited

U.S. PATENT DOCUMENTS

| | | | |
|---|---|---|---|
| 351,087 | 10/1886 | Bean | 251/309 |
| 565,730 | 8/1896 | Foote | 251/309 |
| 610,242 | 9/1898 | Poage | 251/283 |
| 948,519 | 2/1910 | Neal et al. | 137/447 |
| 1,783,441 | 12/1930 | Lewis | 251/283 |
| 1,796,808 | 3/1931 | Roberts | 251/283 |
| 3,218,024 | 11/1965 | Kroekel | 251/283 |
| 3,443,593 | 5/1969 | Colombo | 251/283 |
| 4,103,868 | 8/1978 | Thompson | 251/283 |
| 4,193,578 | 3/1980 | Brumm | 251/283 |
| 4,986,320 | 1/1991 | Kesterman et al. | 137/445 |

Primary Examiner—George L. Walton
Attorney, Agent, or Firm—John J. Murphey

[57] ABSTRACT

A liquid fuel shut-off valve for insertion through the feed pipe opening and mounting inside a fuel tank including, in combination, a valve body having an inlet and an outlet joined by a first bore aligned axially with the feed pipe through which the fuel is fed to fill the tank, a valve spool rotatably mounted in a cross-bore formed in the valve body between the inlet and the outlet and attached to a float extending outward from the valve body that is responsive to the level of liquid in the tank, and a valve shut-off formed in the spool including a second bore formed transverse thereto for passing fuel between the inlet and the outlet, and a relief opening formed in the trailing edge of the wall of the second bore allowing progressive rotation of the second bore from a first position in full hydraulic alignment with the first bore to a second position in full hydraulic closure with the first bore free of a countervailing hydraulic turning moment developed by the flow of fuel there through.

21 Claims, 3 Drawing Sheets

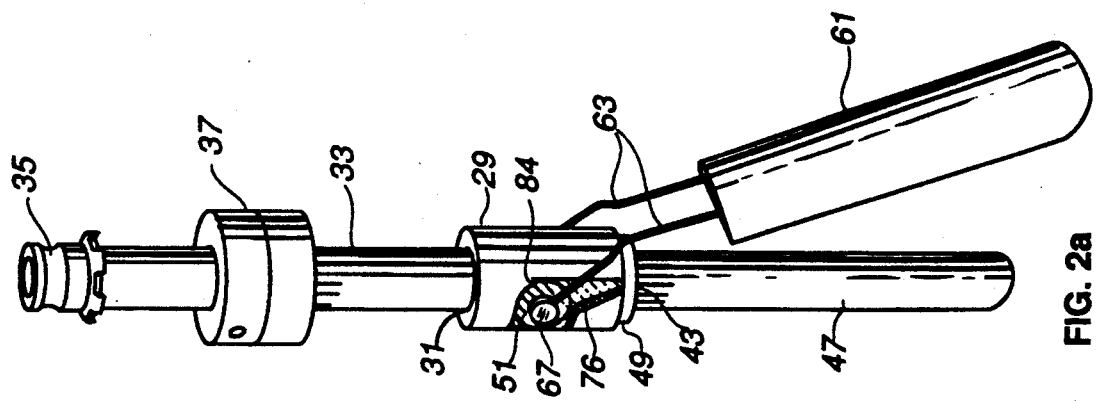
FIG. 2a
FIG. 2b
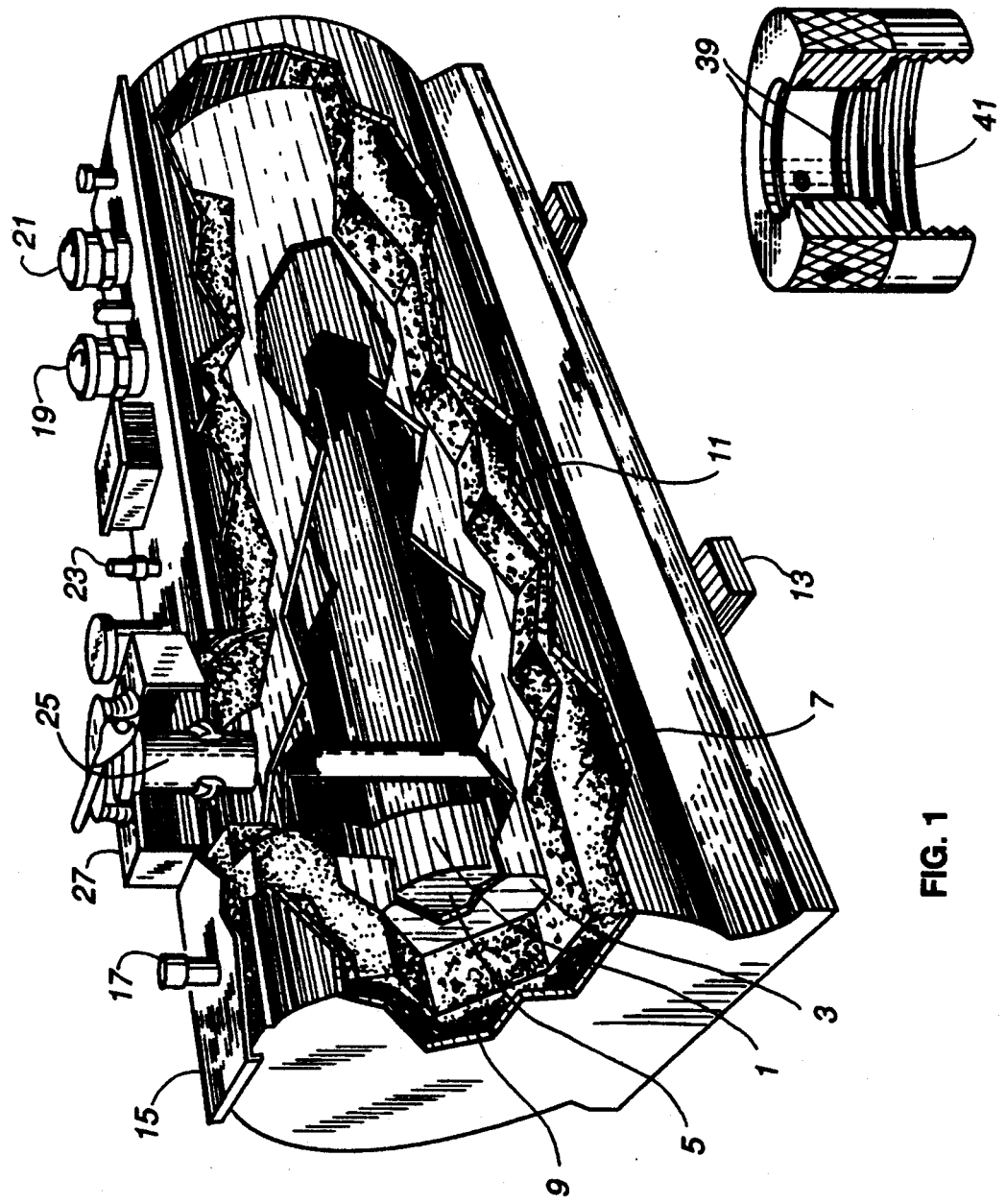
FIG. 1

LIQUID SHUT-OFF VALVE

BACKGROUND OF THE INVENTION

1. Field of the Invention

This invention pertains to the field of valves. More particularly it pertains to a shut-off valve used primarily in the filling of above-ground fuel tanks and to a unique combination of elements therein that permits smooth, safe control of the high pressure fuel flow that accompanies the filling of these tanks.

2. Description of the Prior Art

Fuel tanks have existed since the dawn of the industrial revolution. While many vehicles and machines operated from a self-contained fuel tank, these tanks must be repeatedly refilled to permit continued usage. The tanks, from which these smaller tanks are refilled, and the valving involved therewith is the subject of this invention.

Traditionally, fuel tanks have been buried in the ground. A number of reasons support this philosophy. First, the tank is located below the plane of most human activity and thus out of the path of most accidents, such as runaway vehicles, collapsing buildings, fires, spilled materials and the like. Secondly, the surrounding earth provides not only beneficial insulation against possible penetration by flying missiles but also energy insulation to prevent overheating or overcooling of the tank contents. Thirdly, in the unlikely event of tank failure, the contents would seek a lower level in the earth away from contact with the public.

An ever-growing feeling of public concern over how man impacts our planet has led to reconsideration of this third reason. Conclusive evidence now exists that tank leakage allows fuel and other liquids to spread over enormous sectors of earth poisoning drinking water, reducing the load bearing properties of some soils, toxifying some areas to the extent that horticulture potential is curtailed or eliminated, and allowing fuel and other noxious vapors to be emitted from the ground to the extent that human occupancy is threatened. Tank leakage is caused by numerous factors such as age, corrosion, earthquake, metal fatigue and the like. As a result, legislative activity now compels many businesses to utilize above-ground fuel and other liquid storage and cease all such below ground practices. The storage of volatile and highly flammable fuels such as gasoline and naphtha as well as other liquids such as acids, alkalis and monomers is now often required to be strictly an above-ground activity.

For the most part, the technology of fabricating and filling below-ground tanks has been used in above-ground tanks. That is to say, the wall construction, anchoring, and piping of the tanks has remained substantially the same. The entry way into the top of both types of tanks remains a 4-inch MPT pipe.

A significant difference, however, is required in the process to fill above-ground tanks over that of below-ground tanks. Below-ground tanks are generally gravity fed; i.e., the tanker truck pulls up to the feed pipe, a short length of 4-inch transfer hose is connected between the lower tanker outlet and the top tank inlet, that is flush with the surface of the ground, through a spring-loaded device called a "dry-break coupler", and gravity is used to force the liquid down into the tank in measured volume. A low pressure shut-off valve is inserted in the 4-inch feed pipe and mounted axially therebelow to terminate the fuel flow when the fuel is filled to the appropriate level.

These low pressure shut-off valves are actuated by floats, attached to a moveable valve stop, that float on the surface of the liquid in the tank. As the tank is filled, the float rises with the rising liquid surface and moves the valve stop toward a shut-off valve seat. At a preset level of fullness, the float causes the valve stop to bottom against the valve seat and shut off the incoming flow. The volumetric flow indicator stops, indicating the tank is full. The operator than closes the tanker truck outlet. Drain means, usually in the form of a spring-loaded bypass valve held closed by the flow of fuel, then opens under spring pressure to drain fuel, caught in the fuel line between the dry-break coupler and the closed valve, from the closed valve down into the tank.

In filling above-ground tanks, the short 4-inch transfer hose is replaced with a lighter but far longer 2-inch hose to reach tanks located a distance from where the tanker truck can be parked. A high pressure transfer pump is interconnected therewith to produce an output pressure between 75-125 psi to overcome the added friction of the longer, narrower hose and to give a fuel flow similar to that occurring with below-ground tanks. This fuel flow creates a higher velocity of liquid in the 2-inch hose that causes significant problems with the shut-off valve.

While in below-ground tanks the lower velocity of fuel, passing through the 4-inch line, allows the common valve stop to move progressively from its open position to its closed position against the valve seat, at the higher velocity in the 2-inch line the pressure of the fuel on the valve stop causes it to either be held open leading to over-filling of the tank or to slam down early onto the valve seat, causing premature closing of the valve before the desired degree of filling has been accomplished. Further, the slamming of the valve stop against the valve seat creates a dangerously large shock wave that travels up into the transfer hose to the pump, often causing bursting of the hose, damage to the pump, and fuel leakage at the hose connections.

In other below-ground tank operations, a shut-off valve is used that comprises a pair of "C"-shaped valve flaps that are slowly rotated by rods, attached to one or more annular floats, from an open to a closed position. When used in the high pressure filling of above ground-tanks, the pressure of the high velocity fuel creates a reverse bending moment on the inboard mating edges of the valve flaps causing them to remain open beyond the desired degree of tank filling so that the tank is often overfilled resulting in spillage of fuel on the ground to create a fire hazard as well as environmental damage.

The problem appears to be that prior art shut-off valves are not designed to handle the high flow rates and fuel pressures created by the high pressure pump used to fill above-ground tanks. The industry has been stymied by the problems in this area such that, to date, about the only shut-off valve useful in filling above-ground tanks are those where the valve has such a narrow opening through the valve body that these newly created forces can be somewhat controlled. Unfortunately, these smaller valves reduce fuel flow rates even further and increase handling costs, both of which present obstacles to the safe and efficient handling of fuel and other liquids.

SUMMARY OF THE INVENTION

This invention is a unique liquid shut-off valve that overcomes the problems of the prior art heretofore described. While it is useful in filling below-ground tanks, it is especially useful in filling above-ground tanks using the high pressure pumps and high liquid flow rates previously mentioned. The valve of this invention provides progressive closure of the fuel passageway in a unique manner that eliminates the shock wave generated by prior art devices and further eliminates the counter-turning moments developed in other valves to provide smooth closure at a desired level of fill.

The invention comprises a valve completely insertable into the standard 4-inch entry pipe and axially demountable therein within the top part of the tank. A float extends downward from a cross-bored spool transversely mounted in the valve body and causes the spool to rotate and move its cross-bore out of alignment with the inlet bore as the level of liquid rises in the tank. A unique relief opening is provided in the spool to relieve the countervailing hydraulic turning moments developed by the high fuel flow thus allowing a smoothly progressive rotation of the spool during filling. In addition, the invention includes means to maximize fuel flow through the spool while providing an expanded degree of control over valve closure by disaligning the cross-bore in the spool from the axial bore through the fill tube. Further, the valve is rendered stronger against the forces of the high fuel flow rate by uniquely mounting the spool in a pair of ball bearings.

Accordingly, the main object of this invention is a fuel shut-off valve, particularly useful in filling above-ground tanks, that operates to move from an open to a closed position in a progressive, accurate manner in response to the movement of a float under high fuel flow and fuel pressure conditions. Other objects of the invention include a shut-off valve that operates to accurately close in a progressive manner without the generation of hydraulic shock waves or other deleterious forces; a valve through which fuel flow may be maximized; a shut-off valve that experiences a wider degree of over-closure control than those valves in the prior art; and, a shut-off valve that may be easily retrofitted into existing tanks, both above and below ground, by persons of ordinary training.

These and other objects of the invention will become more apparent upon reading the Description of the Preferred Embodiment taken together with the drawings appended hereto. The scope of protection sought by the inventor may be gleaned from a fair reading of the claims that conclude this specification.

DESCRIPTION OF THE DRAWINGS

FIG. 1 is an illustrative, partially cut-away view of a typical tank with which the invention is usable;

FIG. 2a is a trimetric view of the invention; FIG. 2b is a cut-away view of the valve collar portion thereof;

DESCRIPTION OF THE PREFERRED EMBODIMENT

Figure 3:
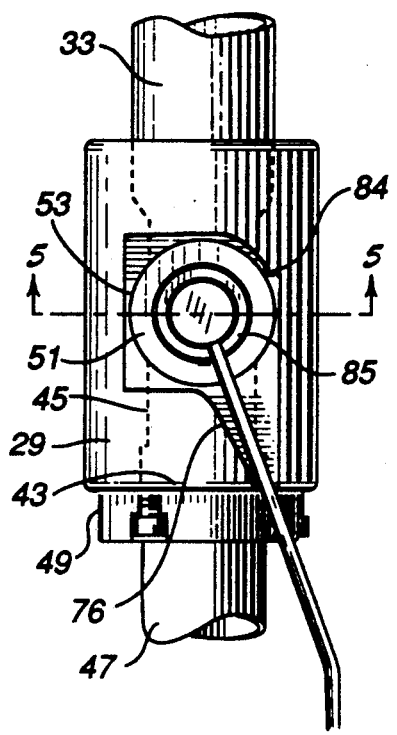
FIG. 3 is a side view of the preferred embodiment of the spool housed in the valve body.

Turning now to the drawings, where like elements are identified with like numbers throughout the nine figures, FIG. 1 shows the typical above-ground tank, and the internal construction thereof, wherein this invention is especially well-suited. This is not to be taken, however, as a limitation of the application or use of the invention, as it is well-suited to be used on below-ground tanks and most large tanks, both of the above-ground or below-ground variety, that hold liquids of all type, both fuels and non-fuels. This invention is described herein as applied to above-ground fuel tanks only as a convenience to the reader.

The tank shown in FIG. 1 generally comprises an Underwriters Laboratory approved primary tank 1 of steel or other construction material that is placed concentrically inside a similarly approved secondary tank 3, spaced-apart therefrom so that an air space 5 is formed therebetween. These tanks are set inside a reinforced concrete vault 7 over which a moisture barrier 9 and an outer steel containment shell 11 are erected. The whole structure is set atop a pair of tank saddles 13 for placement on and attachment to the earth. A removable top plate 15 is overlaid containment shell 11 through which a plurality of lines and stubs extend from primary tank 1, such as a suction line 17, a primary tank vent 19, a secondary vent 21 and a liquid level port 23. For purposes of describing the operation of this invention, attention is directed to the standard 4-inch feed pipe 25 that extends from interior primary tank 1 up through the top thereof to exit the structure, usually through a 7 to 10 gallon overfill catch box 27.

Turning to the FIG. 2a, the preferred embodiment of the invention is shown in its full configuration to comprise a valve body 29 having an upwardly facing inlet 31, to which is attached a fill tube 33 for extending upward through feed pipe 25 to a nipple 35 for connection to a standard dry-break coupler (not shown). A valve anchoring collar 37, shown in FIG. 2b, is slidably mounted concentrically over fill tube 33, above valve body 29, in sealed engagement therewith through one or more O-rings 39, and contains a set of inside threads 41 for mating engagement with the outside threads on feed pipe 25 to concentrically anchor the invention down inside the feed pipe. A gasket 42a is carried in collar 37, above threads 41 for engagement with the upper end of feed pipe 25; set screws 42b, carried in collar 37, are screwed tightly against feed pipe 25 to hold the interconnection in tight assembly.

Figure 6B:
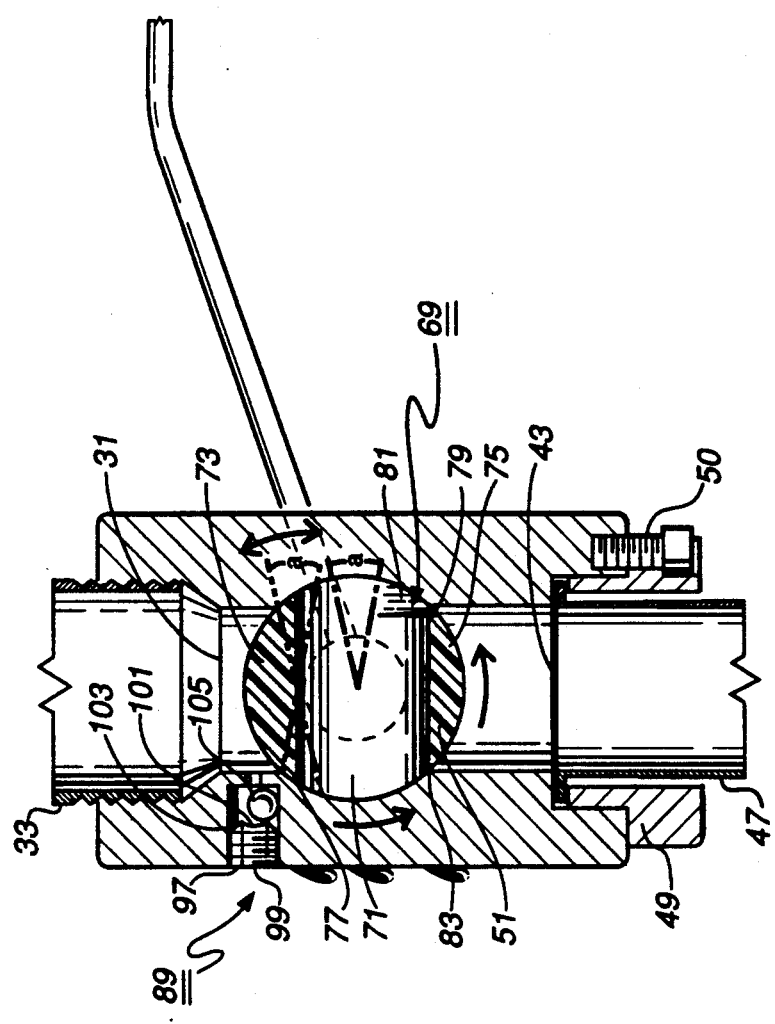
FIG. 6b is another such view with the spool rotated into its closed position; and, FIG. 7 is an illustrative view of the preferred embodiment of the float and its connecting arms.
Figure 6A:
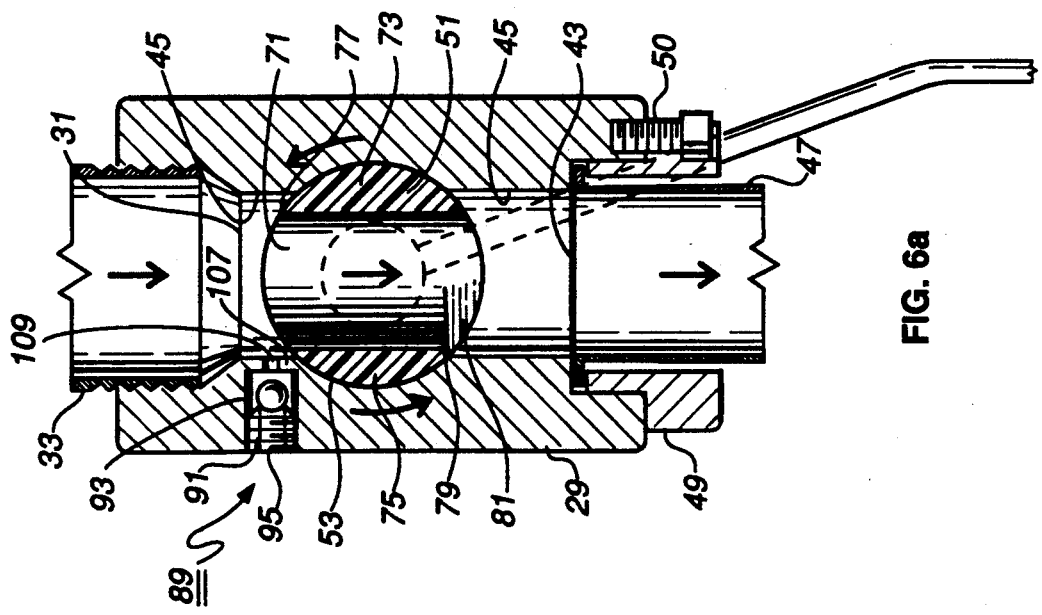
FIG. 6a is an illustrative view of the disalignment of the respective bores of the fill tube and the spool cross-bore.

As shown in FIGS. 3, 6a and 6b, valve body 29 further includes a downwardly facing outlet 43, spaced apart from inlet 31, wherein both said inlet and said outlet are joined through a first bore 45 all of which are co-axially aligned within feed pipe 25 through which the fuel or other liquid is fed to fill primary tank 1. A hollow drop tube 47 is attached to valve body outlet 43 by a collar 49 and collar mounting screws 50 and extends down toward the bottom of tank 1 to convey filling liquid to the lower part of the tank and reduce wave action and other turbulence in the liquid caused by the high velocity so that the float will not be tossed up and down during the filling operation.

Figure 4:
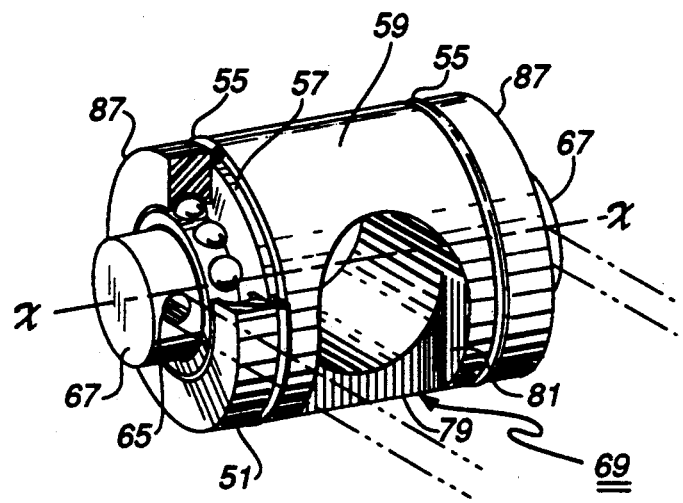
FIG. 4 is a trimetric view, partially cut-away, of the spool.
Figure 5:
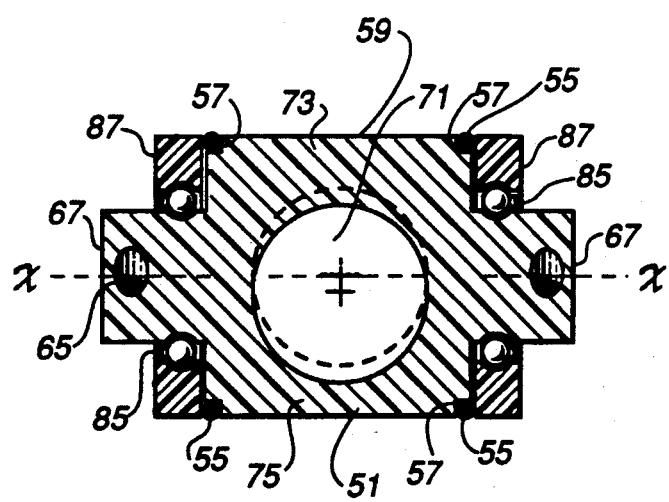
FIG. 5 is a sectional view of the spool taken along lines 5—5 in FIG. 3.
Figure 7:
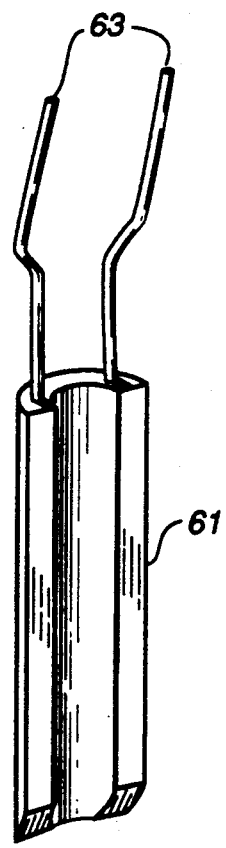

A cylindrical valve spool 51 is rotatably mounted in a crossbore 53 formed in valve body 29. As shown in FIGS. 4 and 5, spool 51 is sealed against leakage of fuel or other liquid passing therethrough by a pair of spaced-apart O-rings 55 that are retained in circumferential grooves 57 formed on spool surface 59. A float 61, shown in FIGS. 2a and 7, is attached by a pair of spaced-apart connector rods 63 to spool 51 by insertion in a pair of bores 65 formed in bosses 67 extending from the ends of spool 51. Float 61 is shaped as a half-cylinder to mate closely about drop tube 47 to form a cylindrical package that, along with valve body 29, may be easily and conveniently slipped down through feed pipe 25 for mounting by valve collar 37, below and axially aligned with said feed pipe. Float 61 is preferably made of a closed-cell, inert, light-weight plastic such as polyurethane, polypropylene, polystyrene or other polyolefin and coated with a barrier film of fuel resistant or liquid resistant material such as epoxy resin or the like.

As shown in FIG. 4, valve shut-off means 69 is formed in spool 51 to allow progressive rotation of said spool to close off feed pipe 25 free of the countervailing hydraulic turning moments and generation of dangerous shock waves that have plagued the prior art. Means 69 comprises a second bore 71 formed in spool 51 transverse to main spool axis x—x. As shown in FIGS. 6a and 6b, bore 71 is smaller in diameter than the diameter of spool 51 and therefor forms second bore first and second bore walls 73 and 75 respectively on the respective sides of second bore 71 to contain the fuel passed between inlet 31 and outlet 43.

When the invention is first inserted into feed pipe 25 and anchored therein by mounting collar 37, float 61 hangs almost vertically downward because of gravity into primary tank 1 held only slightly outward by a downward stop 76 machined into the outer wall of valve body 29. This position of float 61 substantially aligns second bore 71 with first bore 45 to allow a high volumetric flow of liquid or fuel from the tanker truck transfer pump into primary tank 1. As the level of filling liquid rises in primary tank 1, float 61 swings outward on the surface thereof and rotates valve spool 51 in a counter-clockwise motion shown by the arrows in FIGS. 6a and 6b and out of alignment with fill tube 33 and drop tube 47 thus reducing and eventually terminating the flow of liquid through valve body 29. This motion also moves the leading edge 77 of second bore first wall 73 and the leading edge 79 of second bore second wall 75 into the path of the higher velocity liquid passing through second bore 71. Because of this high liquid flow rate, a reverse hydraulic turning moment is generated by the liquid passing through second bore 71 and passing over leading edge 79 of second bore second wall 75. This reverse or countervailing hydraulic moment has been the cause of valve spool hang up or stall in the rotation of prior art shut-off valves and could cause significant over-filling of tank 1 similar to the hang-up problems described with respect to prior art devices.

Means 69 further includes a relief opening 81 such as a notch, undercut, gap, semi-circular opening or other such opening formed in the leading edge 79 of second bore second wall 75 to allow further rotation of spool 51 and permit trailing edge 83 of second bore first wall 73 to rotate into second bore 71 allowing liquid flow to begin at trailing edge 83 to relieve pressure at leading edge 79. As shown in FIGS. 6a and 6b, relief area 81 is preferred to be in the form of a semi-rectangular or half-rectangular opening that is substantially as wide as bore 71. Relief opening 81 thereby allows the pressure on leading edge 79 to be bypassed by the opening generated at trailing edge 83 and greatly reduces the hydraulic moment such as to allow a smooth rotation of spool 51. As the opening at trailing edge 83 begins to widen or become larger, by the counter-clockwise rotation of spool 51, leading edge 77 of second bore first bore wall begins to close over inlet 31 thereby reducing the flow rate through second bore 71 causing an orderly shut-off of the liquid flow responsive to the true position of float 61. The rotation of spool 51 is terminated by float arm 63 striking a second, upward stop 84 machined into the outer wall of valve body 29, after full rotation of spool 51 from its first open position to its second closed position as shown in FIG. 6b.

Further, the main axis of second bore 71 is preferably axially displaced or disaligned a short distance from the main axis of first bore 45 as shown in FIG. 5. As shown, second bore first wall 73 is thicker on the side second bore first bore wall 73 in the direction of valve inlet 31, and thinner on the side of second bore second wall 75 in the direction of valve outlet 43 when said valve is closed by the rise of float 61. It is preferred that this disalignment be on the order of 0.100 inches for a 2-inch diameter valve; the dimension will change for different sized valves. As shown by the dotted lines in FIG. 6b, this greater thickness of wall 73, in the direction of valve inlet 31, allows spool 51 to be rotated in both directions through a greater angle "a" and yet insure full valve closure than would be permitted if the wall thickness were thinner, such as in second bore wall 75. This allows float 61 to rise and fall with the waves created on the liquid surface in the tank as the fuel fills the tank under high pressure without "cracking" open the valve. Without this, the waves could cause float 61 to rise and fall allowing the valve to momentarily open slightly at each peak or valley and admit more fuel to the tank. Such oscillations could cause overfilling of the tank.

This design also allows the diameter of second bore 71 to be maximized to allow the highest possible flow rate through valve body 29, while at the same time providing enough wall thickness in the direction of valve outlet 43 to retain the design integrity of valve spool 51 and prevent its collapse under the high flow rate and pressure exerted by the incoming fuel.

Under the high velocity and intense pressure of the fuel passing down fill tube 33 and through second bore 71, a strong downward force is exerted on valve spool 51. In the prior art, virtually all valve spools and other rotating internal elements were held in place by simple O-rings or other such pliable gaskets. With above-ground tank filling procedures involving such high pressures at the transfer pump, the intense downward pressure exerted on spool 51 is sufficient to cause O-rings 55 to be mashed out of round driving spool 51 out of concentricity in cross-bore 53 and increasing the frictional load or resistance to turning of said spool as well as leakage of liquid by the top of the O-rings. To remedy this, a pair of ball bearing races 85 is placed in spaced-apart arrangement near the ends of spool 51, outboard of O-rings 55, as shown in FIGS. 4 and 5, and held there by annular end rings 87 to retain valve spool 51 in concentricity with cross bore 53 during all flow rates of fuel or other liquid passing through valve body 29. It has been found convenient to locate annular groove 57 at the beveled circumferential edges between the adjacent surfaces of end rings 87 and valve spool 51 as shown in FIGS. 4 and 5.

It is preferred to form the ball races in grooves formed respectively on the outside and inside of circumferential edges of valve spool 51 and end rings 87 and then add the ball bearings when assembling the spool. It is further preferred to make spool 51 and end caps 87 from a machinable plastic, such as Delrin (trademark) and place the stainless steel balls therebetween when assembling the parts. Delrin is inert to most fluids and is easily castable and machinable to industry standard tolerances, and exhibits a low surface friction thus enabling the valve to operate at low entropy levels.

After valve spool 51 is rotated by float 61 into a closed position, as shown in FIG. 6b, the pressure of the fuel above valve body begins to rise. A pressure sensor located at the transfer pump outlet on the tanker truck responds to this increased pressure by shutting off the pump. The pump, transfer hose and fill tube 33 remain full of fuel. The dry break coupler will part the transfer hose from fill tube 33 without allowing any leakage of fuel therefrom. However, at this point it is important to drain the fuel from fill tube 33 down into tank 1. As shown in FIGS. 6a and 6b, a drain means 89 is provided to drain the liquid from fill tube 33 into tank 1 after pressure is removed from the fill tube.

As shown in FIGS. 6a and 6b, drain means 89 comprises a short plug 91 threadably received in a longer bore 93 formed in and completely through the wall of valve body 29, said plug having a center passage way 95 extending therethrough from an outer installable end 97, such as a wrench fitting opening 99, formed therein, through to an inner end 101 on which a semi-conical seat 103 is formed. A hard, preferably metal, ball 105 is located near seat 103 in bore 93 and held therein by a wall 107 spaced-apart therefrom having a small aperture 109 formed therethrough passing into valve body inlet 31. The lower edge of seat 103 is preferable spaced above bore 93 a distance less than the radius of ball 105 but more than zero to allow ball 105 to fall away by gravity from said seat. When liquid is being forced down the fill tube 33 into tank 1, the pressure forces ball 105 to center itself in seat 103 and prevent flow of liquid through center passageway 95. Upon releasing the pressure, such as when the transfer pump is shut off, the weight of hard ball 105 allows it to drop by gravity off seat 103, thereby opening passageway 95 from valve body inlet 31 through aperture 109, seat 103 and out valve body 29 down into tank 1 and allowing liquid to drain therethrough as shown in FIG. 6b. As soon as pressure is again applied by fuel descending fill tube 31, ball 105 is once again forced up into conical seat 103 to close off any flow of liquid therethrough.

The reason for this design is that certain spring-loaded pressure release valves, utilized with gravity filled below-ground tanks, leak fuel when used with above-ground tanks such that the pressure sensor will not turn off the transfer pump. This allows a continuing, albeit small, flow of liquid into the tank after the shut-off valve closes, resulting in dangerous overfilling of the tank. The unique design of this particular relief valve makes it closeable only upon the passage of high velocity and large flow rates of fuel through valve body 29.

Valve body 29 and collar 37 are most conveniently made of aluminum; especially preferred is hard anodized aluminum. Spool 51 is preferred to be constructed from a liquid resistant, low friction material such as plastic like Delrin (trademark) as aforesaid.

While the invention has been described with reference to a particular embodiment hereof, those skilled in the art will be able to make various modifications to the described embodiment without departing from the true spirit and scope thereof. It is intended that all combinations of elements which perform substantially the same function in substantially the same way to achieve the same results are within the scope of this invention.

What is claimed is:

1. A float-actuated valve for shutting off high flow rates of liquid fed into a tank comprising, in combination:
    a) a valve body having an inlet and an outlet joined by a first bore aligned co-axially with the feed pipe through which the liquid is fed to the tank; and,
    b) a valve spool rotatably mounted in a cross-bore formed in said valve body, between said inlet and said outlet, and attached to a float spaced outward from said valve body that is responsive to the level of liquid in the tank;
    c) said spool having formed therethrough a second bore terminated by an inlet and an outlet, creating an upstream second bore first wall and a downstream second bore second wall on the respective sides of said second bore in said spool for containing the flow of liquid passing therethrough, for rotation by said float from a first position in general alignment with said first bore, to allow passage of large volumes of liquid therethrough, through a series of intermediate positions, where the flow is progressively reduced by the respective leading edges of said second bore first and second walls moving into the path of the flowing liquid, to a second position where said second bore is in full non-alignment with said first bore to totally shut off the flow of liquid;
    d) said valve including relief means associated with said downstream second bore second wall of said spool to reduce the pressure of the flow, during rotation of said spool through said series of intermediate positions, to counteract the hydraulic turning moment developed by the large flow of liquid tending to hold the valve open against the action of said float when said spool is rotated to said second position.

2. The shut-off valve of claim 1 further including a fill tube extending upward from said valve body inlet through the feed pipe opening for connection to the source of liquid to be fed into the tank.

3. The shut-off valve of claim 1 further including a drop tube extending downward from said valve body outlet into the tank to convey liquid from said valve to a lower elevation in the tank.

4. The shut-off valve of claim 1 further including a fill tube extending upward from said valve body inlet through the feed pipe opening, for connection to the source of liquid to be fed into the tank, and a valve collar adjustably positioned annularly about said fill tube for threadable receipt over the feed pipe opening into the tank.

5. The shut-off valve of claim 1 wherein:
    a) said spool is mounted transverse to said first bore so that, as said spool is rotated by said float, the leading edge of said downstream second bore second wall passes into the path of the high velocity liquid passing therethrough to reduce the effective area of said second bore and reduce the flow of liquid therethrough; and,
    b) said means including a relief opening formed in said spool to relieve the pressure of the liquid passing over said leading edge of said downstream second bore second wall.

6. The shut-off valve of claim 5 wherein said relief opening is as wide as said second bore.

7. The shut-off valve of claim 5 wherein said relief opening includes a notch formed in said leading edge of said second bore second wall.

8. The shut-off valve of claim 5 wherein said relief opening includes an undercut formed in said leading edge of said second bore second wall.

9. The shut-off valve of claim 5 wherein said relief opening includes a semi-circular cut-out formed in said leading edge of said second bore second wall.

10. The shut-off valve of claim 5 wherein said relief opening includes a gap formed in said leading edge of said second bore second wall.

11. The shut-off valve of claim 5 wherein said relief opening includes a semi-rectangular opening formed in said leading edge of said second bore second wall having an opening substantially as wide as said second bore.

12. The shut-off valve of claim 1 further including a pair of spaced-apart ball bearings interconnected said valve spool and said valve body to maintain the concentricity of said spool in said cross-bore during high flow rates of liquid therethrough.

13. The shut-off valve of claim 12 further including a pair of elastic O-rings interposed said valve spool and said valve body to reduce leakage of liquid from said valve body during passage of liquid therethrough.

14. The shut-off valve of claim 1 wherein said second bore is disaligned from said first bore in a direction that produces a thicker and broader upstream second bore first wall to close said valve body inlet and increase the span of rotational movement of said spool to insure full valve closure once said float has reached a height signifying the predetermined degree of fullness of the tank.

15. The shut-off valve of claim 14 where said disalignment is on the order of 0.100 inches for a 2-inch diameter valve.

16. The shut-off valve of claim 1 further including a lower rotational stop and a higher rotational stop to restrict the angular movement of said valve spool by said float.

17. The shut-off valve of claim 1 wherein said float is shaped as a half-cylinder to mate closely about said drop tube to form a cylindrical package that, along with said valve body, may be easily and conveniently slipped down through the tank feed pipe for mounting therein.

18. The shut-off valve of claim 17 further including a pair of spaced-apart connector rods extending from said float for receipt in bosses formed in the ends of said spool to hold said float in spaced-apart relation therewith.

19. The shut-off valve of claim 1 further including drain means located in said valve body for draining the fuel, remaining in the feed pipe after the flow of filling liquid to the tank is terminated, into the tank.

20. The shut-off valve of claim 19 wherein said drain means comprises:
a) a short plug threadably received in a longer bore formed in said valve body and extending from said valve inlet to the outside of said valve body, said plug having a center passageway formed therethrough and extending from an outer end in communication with the outside of said valve body to an inner end in communication with said valve inlet on which a semi-conical seat is formed; and,
b) a hard ball captured in said longer bore between said seat and a wall spaced apart therefrom having an aperture formed there through passing into said valve body inlet;
c) the lower edge of said seat being spaced above the lower wall of said bore a distance less than the radius of said ball but more than zero to allow said ball to be held in sealing position on said seat by the pressure of the incoming liquid passing down through said valve inlet into said tank and then to fall away by gravity from said seat after said valve is closed to allow still liquid held above said valve body to drain through said aperture, said seat, and said longer bore to the outside of said valve body and run down into the tank.

21. A float-actuated valve for shutting off high flow rates of liquid fed into a tank comprising, in combination:
a) a valve body having an inlet and an outlet joined by a first bore aligned co-axially with the feed pipe through which the liquid is fed to the tank; and,
b) a valve spool rotatably mounted in a cross-bore formed in said valve body, between said inlet and said outlet, and attached to a float spaced outward from said valve body that is responsive to the level of liquid in the tank;
c) said spool having formed therethrough a second bore with an inlet and an outlet, creating an upstream second bore first wall and a downstream second bore second wall on the respective sides of said second bore for containing the flow of liquid passing therethrough, for rotation by said float from a first position in general alignment with said first bore, to allow passage of large volumes of liquid therethrough, through a series of intermediate positions, where the flow is progressively curtailed, to a second position in full non-alignment with said first bore wherein the flow of liquid is totally shut off;
d) said valve including means forming a relief opening in said leading edge of said second bore second wall in said spool to reduce the pressure of the flow as it passes over the trailing edge of said second bore second wall and into the tank to reduce the hydraulic turning moment normally developed at said leading edge of said second bore second wall by the flow of liquid thereacross when said spool is rotated to said second position.

* * * * *